United States Patent [19]

Dutschke

[11] Patent Number: 4,862,756

[45] Date of Patent: Sep. 5, 1989

[54] ADJUSTABLE THROW ECCENTRIC DRIVE

[76] Inventor: Reginald V. Dutschke, Brinkworth, State of South Australia, Australia

[21] Appl. No.: 291,313

[22] Filed: Dec. 27, 1988

[30] Foreign Application Priority Data

Dec. 17, 1986 [AU] Australia .................. PH9552

[51] Int. Cl.[4] .............................................. B07B 1/36
[52] U.S. Cl. ..................... 74/26; 209/365.1; 366/108
[58] Field of Search ........... 74/571 R, 571 L, 571 M, 74/568, 836, 86, 26; 366/108, 128; 209/365.1, 365.4

[56] References Cited

U.S. PATENT DOCUMENTS

| | | | |
|---|---|---|---|
| 273,846 | 3/1883 | Hoxsie | 74/571 X |
| 321,001 | 6/1885 | Black et al. | 74/571 L |
| 1,033,570 | 7/1912 | Ferrari | 74/571 L |
| 1,149,728 | 8/1915 | Ciarlo | 74/571 L |
| 1,191,230 | 7/1916 | Rich | 74/571 L |
| 1,627,678 | 5/1927 | Stebbins | 74/26 |
| 1,720,299 | 7/1929 | Stebbins | 74/26 |
| 2,725,984 | 12/1955 | Klemenoic | 209/365.1 |
| 2,795,968 | 6/1957 | Eriksson | 74/571 L |
| 2,937,536 | 5/1960 | Clement | 74/26 |
| 2,985,474 | 5/1961 | Cook | 74/571 M X |
| 3,119,280 | 1/1964 | Mann et al. | 74/571 L |
| 3,410,408 | 11/1968 | Tonjes | 209/365.1 |
| 3,825,118 | 7/1974 | Feller | 209/365.4 X |
| 3,989,537 | 11/1976 | Sickmeier | 366/128 X |
| 4,134,689 | 6/1979 | Ahrenskou | 366/128 X |
| 4,485,693 | 12/1984 | Heikkilä | 74/571 L X |

*Primary Examiner*—Peter A. Aschenbrenner
*Attorney, Agent, or Firm*—Oldham & Oldham Co.

[57] ABSTRACT

An eccentric pulley arrangement either driven or driving by which rotary motion can be transferred to reciprocal motion. A pulley has an angled shaft through its center of rotation with a second shaft through the angled shaft. Movement of the angled shaft with respect to the pulley or the second shaft changes the center of rotation of the pulley and hence the degree or eccentricity can be changed during motion.

9 Claims, 3 Drawing Sheets

ADJUSTABLE THROW ECCENTRIC DRIVE

This is a divisional of co-pending application Ser. No. 07/133,934 filed on Dec. 17, 1987.

This invention relates to an adjustable throw eccentric pulley.

Many methods have been provided for eccentric drive of various items of equipment, but these have usually involved a fixed amount of eccentricity or if variability is possible, some very complicated method for adjusting the amount of eccentricity has been provided.

For instance, Australian patent specifications Nos. 525,848; 61,124/80 and 413,466 all provide eccentric drives for screens by means of an off-centre weight rotating on a shaft. Such eccentrics provide considerable strain on bearings and require that the motor for driving the eccentric weight on the shaft be mounted on the moving frame of the sieve. This means, for instance, that electrical connections for the motor must be able to take considerable continuous vibration.

Australian patent specification No. 447,195 provides a fixed degree of eccentricity using a moving weight in much the same manner.

Australian patent specification No. 499,353 provides a stepless variable stroke drive system which uses two eccentric cams which are separated by direct lateral movement of eccentrics relative to a rotating shaft to give a variable stroke. This does not directly provide a vibration and adjustment of stroke length can only be achieved when the device is stationary.

The present invention provides an alternative method with simpler engineering to provide an eccentric drive which can be adjusted for different amounts of throw with less moving parts, and which at least in some embodiments can be adjusted while the device is working.

While this invention will be particularly described in relation to driving a vibrating screen, or a sifter, or other materials processing equipment, it will be realized that the invention can be applied to a much wider range of equipment.

In one form therefore the invention is said to reside in a variable eccentric drive comprising a first rotatable shaft having a first longitudinal rotational axis, an eccentric sleeve mounted for longitudinal movement on the first on the first shaft, the sleeve having a second longitudinal axis inclined at an acute angle to the first axis, and a wheel having a third axis of rotation mounted for longitudinal movement on the sleeve, the plane or rotation of the wheel being normal to the first axis, whereby longitudinal movement of the eccentric sleeve on the first shaft changes the radial distance between the first axis and the third axis whereby altering the eccentricity of the wheel with respect to the shaft.

In one embodiment the wheel may be driven by a belt or a chain or alternatively the shaft may be driven and the wheel more eccentrically.

Preferably there may be means to restrain movement of the wheel so that the shaft has a eccentric motion. This can be by oppositely extending belts or by slide plates, the restraining of movement may be in one or two planes at right angles to each other.

In an alternative form the invention may be said to reside in variable throw eccentric pulley arrangement comprising a first longitudinal shaft having a first longitudinal axis of rotation, a traveller on the first shaft adapted to move longitudinally along the length of the first shaft, first key adn keyway means to prevent rotation of the traveller with respect to the first shaft, the outer surface of the traveller being of constant cross-section throughout its length and comprising a second shaft whose axis of rotation is inclined at an acute angle to the first longitudinal axis of rotation, and a pulley on the traveller adapted to move along the length of the traveller to rotate therewith, the pulley having its plane of rotation perpendicular to the first longitudinal axis of rotation.

It will be seen that by this form of the invention, by moving the pulley along the traveller which is angled to the first shaft, the distance between the centre of rotation of the first shaft in relation to the pulley can be varied so that an eccentric motion of the pulley may be obtained. The pulley may be a driven pulley or a driving pulley. In one preferred embodiment the position of the pulley along the traveller may be varied and hence the amount of eccentric throw of the pulley may be varied while the pulley is in motion.

Alternatively the position of the pulley with respect to the first shaft may be fixed and the traveller may be moved with respect to both the first shaft and the pulley to vary the amount of eccentric throw of the pulley.

There may be provided a thrust race bearing upon the end of the traveller to move the traveller with respect to the first shaft.

In one preferred embodiment the outer surface of the traveller may be cylindrical about the axis of rotation of the second shaft or traveller, and a second key and keyway means may be provided to prevent rotation of the pulley with respect to the shaft while allowing longitudinal movement therealong.

The acute angle of the second shaft with respect to the first shaft, may be in the range of two degrees to ten degrees, with five degrees being a preferred angle.

The means to move the pulley along the second shaft may be adapted to be operated while the pulley is in motion, or may only be adjusted when the pulley is stationary. The adjustment may be by means of a screw thread or other mechanical or hydraulic system.

In an alternative embodiment, the invention may be said to reside in a variable throw eccentric pulley arrangement comprising a rotatable shaft having a first longitudinal axis of rotation, a portion of the shaft comprising a shaft section having a second longitudinal axis of rotation inclined at a acute angle to the first longitudinal axis of rotation, a traveller on the shaft section adapted to be variably positioned along the length of the shaft section, and a pulley on the traveller constrained to rotate with the traveller and rotatable shaft, and having its plane of rotation perpendicular to the first longitudinal axis of rotation whereby rotation of a shaft causes eccentric rotation of the pulley.

Alternatively, rotation of the pulley may cause eccentric movement of the shaft.

In one embodiment of this form of the invention there may be included means to variably position the traveller along the shaft section, and means to lock the traveller in a selected position.

Once again the acute angle may be in the range of two degrees to ten degrees, with a preferred embodiment of five degrees.

The portion of the shaft which includes the shaft section, may be merely a cranked portion of the main shaft or it may be a section of particular shaping mounted onto the shaft. The shaping may be square, circular, triangular, or any other convenient shape, but of constant cross-section throughout its length so that the traveller may move along this portion of the shaft. The pulley may be a driven pulley or a driving pulley.

In a further form the invention may be said to reside in a shaking frame comprising a first fixed frame and a second vibrating frame supported for vibration or eccentric motion with respect to the first frame, at least first and second rotatable shafts including first and second drive or driven pulleys mounted on the first frame towards the ends thereof, a third rotatable shaft mounted for rotation on the vibrating frame between the first and second shafts, an eccentric third drive pulley mounted on the third shaft, and drive belts between the first and third and second and third pulleys respectively, whereby rotation of the first and third shaft causes rotation of the third pulley and hence eccentric vibration of the third shaft through the eccentric third pulley, thereby vibrating the vibrating frame.

The eccentric drive third pulley may be in any of the forms as discussed above. There may be further included a motor to drive the first or second shafts, the motor being mounted on the fixed frame.

This then generally describes the invention but to more clearly assist with understanding this invention, reference will now be made to the accompanying drawings which show preferred embodiments of the invention.

Figure 1:
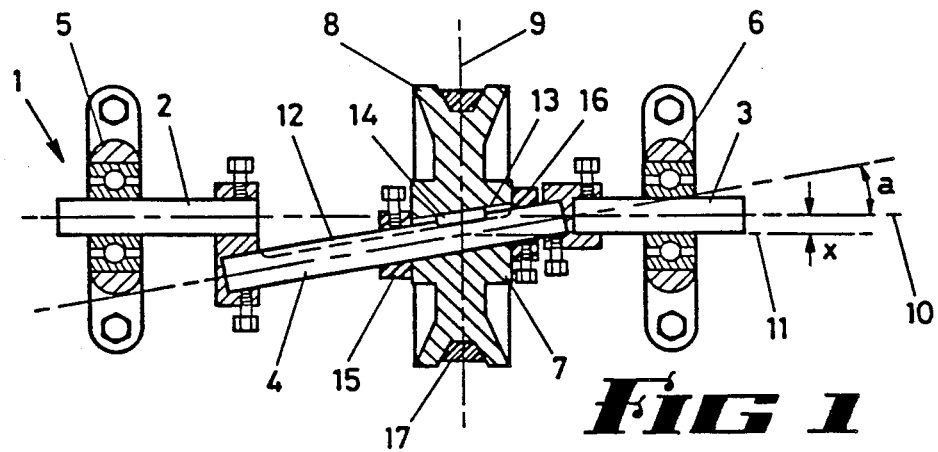
FIGS. 1, 2 and 3 show one embodiment of the present invention with a traveller and pulley mounted at variable positions along the length of the angled shaft.
Figure 2:
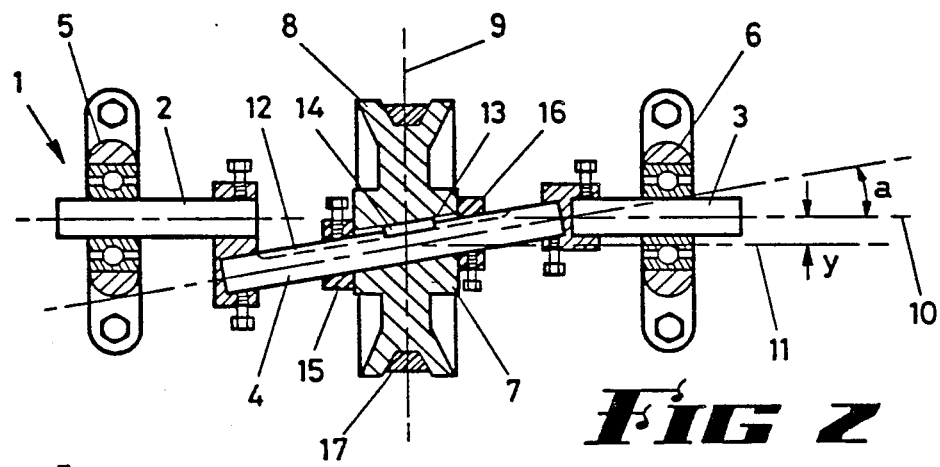
Figure 3:
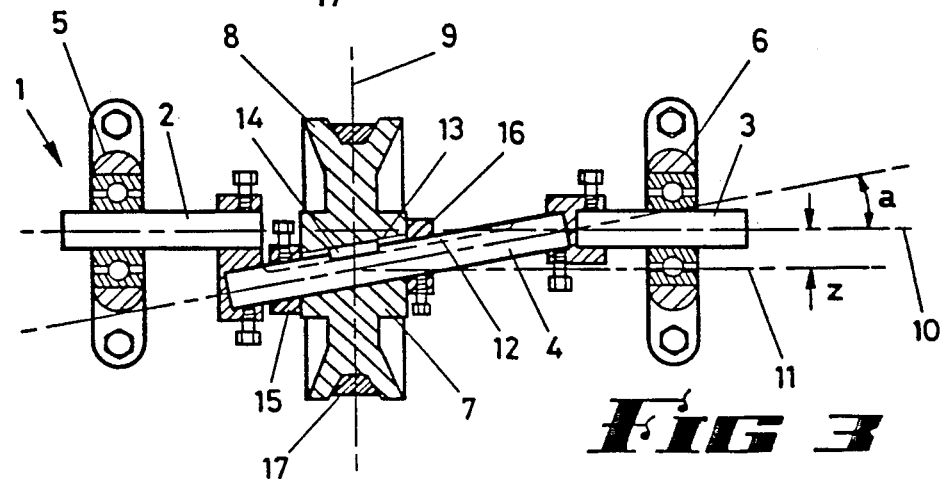

Now looking more closely at FIGS. 1, 2 and 3, it is seen that there is a first shaft 1 comprising sections 2 and 3 with an angled intermediate shaft 4. In this embodiment the angle of the longitudinal rotational axis of the shaft 4 with respect to the shaft 1 is shown as angle a, and as discussed above the angle a may be in the range of two degrees to ten degrees, with, in a preferred embodiment five degrees. Shaft 1 is supported in plummer blocks 5 and 6 for rotation and may either be driven by means not shown or driven by means of a pulley as will be discussed later.

On the angled shaft 4 a traveller 7 may be mounted with an angled aperture through the traveller so that a pulley 8 mounted on the traveller may have its plane of rotation 9 at right angles to the axis of rotation 10 of the shaft 1. The actual centre of rotation of the pulley 8 is shown by the lines 11. A keyway 12 in the second shaft and corresponding keyway 13 in the traveller and key 14, enable the traveller to move along the length of the shaft 4 but to rotate therewith.

In particular in FIG. 1 traveller 7 is positioned at one end of the shaft 4 so that the difference in distance between the axis of rotation of the third shaft 1 shown by 10 and the axis of rotation of the pulley shown by line 11 is the distance x and with rotation of the shaft the pulley will only vibrate a little bit. Locking of the traveller in a desired rotation is provided by locking nuts 15 and 16 on either side of the traveller.

In FIG. 2 the traveller has been moved down the length of the shaft 4 so that the distance y between the axis of rotation 10 and the axis of rotation 11 is now greater and with the same amount of rotation of the shaft 1 a greater vibration distance will be provided.

In FIG. 3 the traveller has been moved a long distance down the shaft 4 and the distance between the axis of rotation 10 and the axis of rotation 11 shown by z is even greater.

Belt 17 driven by pulley 8, or driving pulley 8, may in the case of being driven by pulley 8 transfer vibration to another pulley on a vibrating frame, or if a driven pulley may vibrate the shaft 1 with respect to the pulley which is driving the driven pulley 8.

Figures 4, 5:
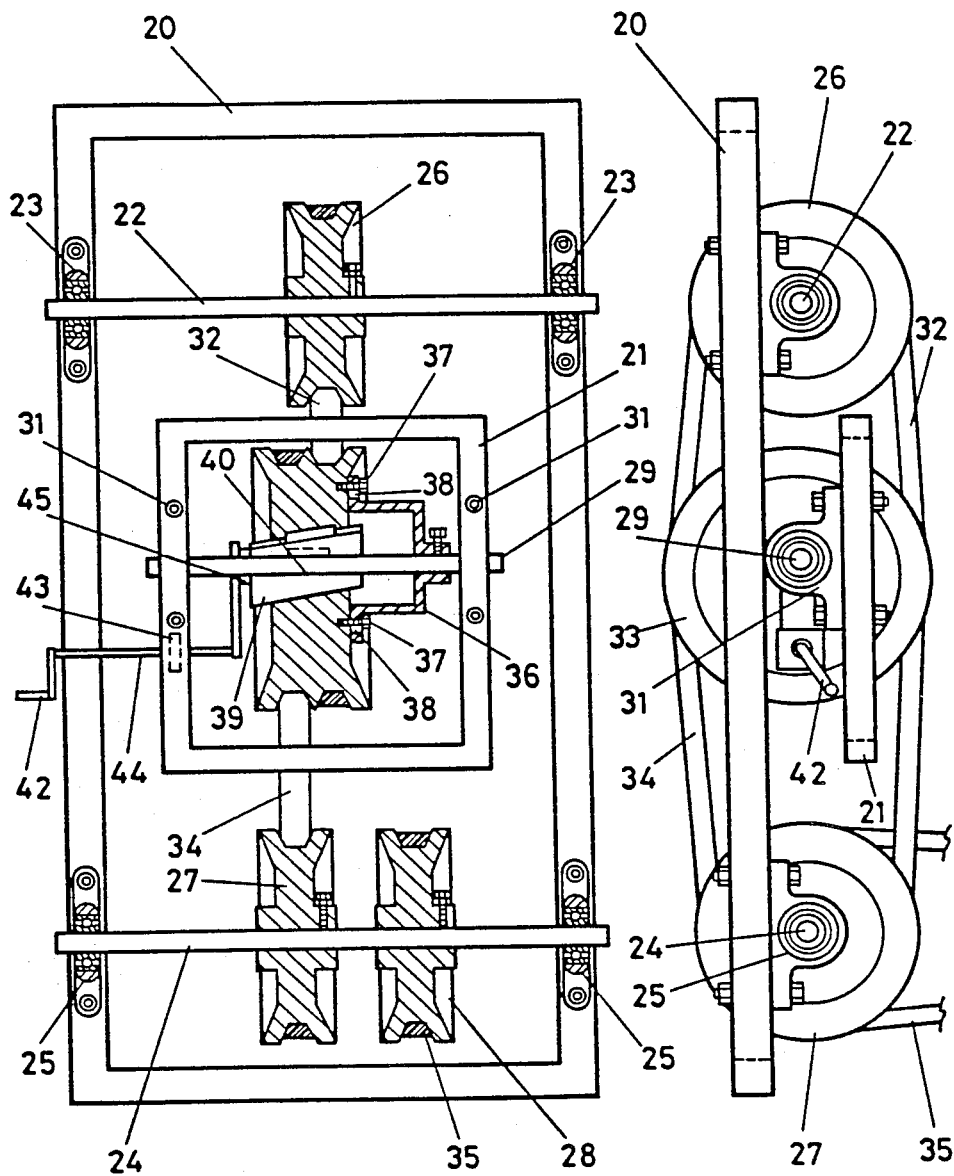
FIG. 4 shows a vibrating frame according to an embodiment of the present invention in plan view.
FIG. 5 shows a side view of the frame of FIG. 4.

Now looking at FIGS. 4 and 5, it will be seen that there is provided a fixed frame 20 and a vibrating frame 21. On the fixed frame 20 a first shaft 22 is provided mounted by means of plummer blocks 23 at one end of the fixed frame, and towards the other end a second shaft 24 mounted by plummer blocks 25. On shaft 22 a first pulley 26 is provided and on shaft 24 a second pulley 27, and a motor driven pulley 28 are provided.

On the vibrating frame 21 is mounted a third shaft 29 and an eccentric pulley arrangement 30 as will be discussed later is on the shaft 29. Plummer blocks 31 mount the shaft 29 onto the frame 21. Drive belt 32 extends from pulley 26 to eccentric pulley 33 and drive belt 34 extends from pulley 27 to eccentric pulley 33. Drive belt 35 extends from a motor not shown to the shaft 24 to drive the shaft 24 and hence pulley 27 and hence pulley 33 and idler pulley 26.

As belts extend in both directions from the pulley 33, the pulley 33 cannot itself move eccentrically, and as there is an eccentric drive arrangement between the pulley 33 and the shaft 29, the shaft 29 is moved eccentrically and hence moves the frame 21 so that the frame 21 moves with respect to the frame 20.

The eccentric pulley arrangement 30 is different than that shown in the earlier embodiments and works as follows. By means of spider 36 mounted to rotate with the shaft 29 and onto the pulley 33, the pulley 33 is constrained to rotate with respect to the shaft 29 but the mounting screws 37 for the spider onto the pulley 33 enable the pulley to move laterally with respect to the spider 36. Slotted apertures 38 are provided for this purpose in the mounting plate for the spider to the pulley 33. A traveller 39 is keyed by key and keyway means to the shaft 29 so that it can move along the length of the shaft 29 while rotating therewith. The traveller 39 is also keyed by means of key 41 to the pulley 33 so that it will rotate therewith while moving along the length of the traveller. The traveller is inclined at an angle to the shaft 29 so that moving the traveller with respect to both the shaft 29 and the pulley 33 will change the position of the centre of rotation of the pulley 33 with respect to the shaft 29, and hence when rotated eccentric vibration of the shaft 29 with respect to the pulley 33 will occur. Adjustment handle 42 is provided which acts through block 43 which has a screw threaded aperture corresponding to a screw thread on the shaft 44, so that thrust race 45 is movd along the shaft 29 and hence moves the position of the traveller 39 with respect to the shaft 29.

Figures 6, 7:
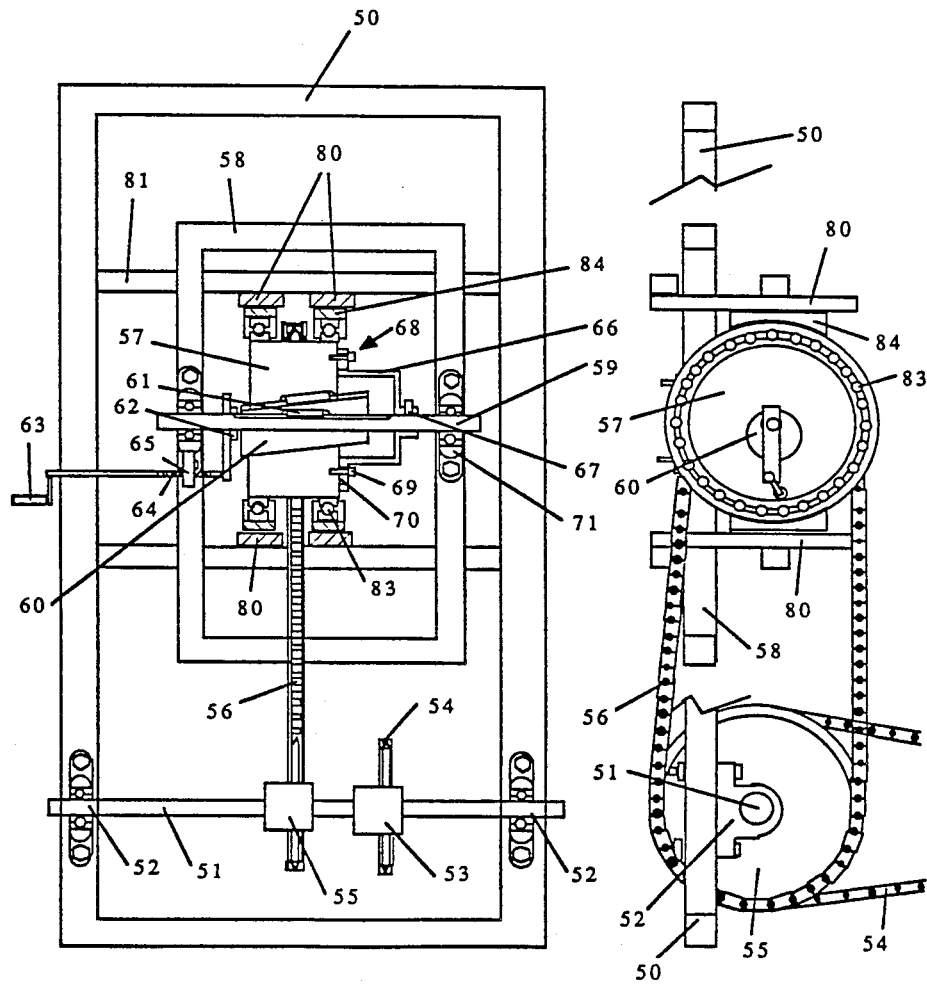
FIG. 6 shows a vibrating frame according to an alternative embodiment of the invention.
FIG. 7 shows a side view of the frame of FIG. 6.

An alternative embodiment of vibrating frame is shown in FIG. 6. In this embodiment a fixed frame 50 has at one end a drive shaft 51 fixed or rotating on plummer blocks 52. A chain wheel 53 driven by a belt 54 from a motor (not shown) drives the cog wheel 55. Chain 56 driven by cog wheel 55 drives eccentric wheel 57.

Vibrating frame 58 has shaft 59 fixed for rotation. An eccentric sleeve 60 if mounted for longitudinal movement on the shaft 59 and by means of key 61 in constrained to rotate therewith. Thrust race 62 moved by hand wheel 63 with threaded shaft 64 in block 65 moves the eccentric sleeve longitudinally with respect to the shaft.

The eccentric wheel 57 is mounted for longitudinal movement on the sleeve 60 but is constrained to remain fixed longitudinally with respect to the shaft 59 by means of spider 66 fixed at 67 to the shaft 59 and to the wheel at 68 while allowing transverse movement of the wheel 578 with respect to the spider 66 by means of bolt 69 sliding in slot 70.

Fixed slide plates 80 mounted by means of brackets 81 to the fixed frame 50 constrain the eccentric motion of the wheel so that the shaft 59 moves eccentrically. Ball race 83 enables the wheel 57 to turn while slides 84 fixed to the outside of the ball race 83 move laterally.

Eccentric motion of the shaft 59 therefore only occurs at right angles to the sliding plane of the slides 84 and slides 80.

If the wheel was constrained in two planes at right angles to each other then the shaft 59 would have an orbital eccentric motion.

Hand wheel 63 enables the amount of eccentric motion to be varied while the device is in motion. it will be seen that by both these embodiments discussed above, a simple means is provided for changing rotary motion and in which in at least one embodiment can be adjusted while the device is in motion.

The claims defining the invention are as follows:

1. A shaking frame comprising a first mixed frame and a second vibrating frame adapted to shake with respect to the first frame, at least first and second rotatable shafts including first and second drive pulleys mounted on the first frame towards the ends thereof, a third rotatable shaft mounted for rotation on the vibrating frame between the first and second shafts, an eccentric drive third pulley mounted on the third shaft, drive belts between the first and third and second and third pulleys respectively, whereby rotation of the first and third shafts causes rotation of the third pulley and hence eccentric vibration of the third shaft through the eccentric third pulley thereby vibrating the vibrating frame.

2. A shaking frame as in claim 1 wherein the eccentric drive pulley comprises the third shaft having a third longitudinal axis of rotation, a traveler on the third shaft adapted to move longitudinally along the length of the third shaft, first key and keyway means to prevent rotation of the traveller with respect to the third shaft, the outer surface of the traveler being of constant cross-section throughout its length and comprising a fourth shaft whose axis of rotation is inclined at an acute angle to the third longitudinal axis of rotation, and a pulley on the traveler adapted to move along the length of the traveller to rotate therewith, the pulley having its plane of rotation perpendicular to the third longitudinal axis of rotation.

3. A shaking frame as in claim 1 wherein adjustment means are provided to adjust the position of the pulley along the length of the traveler and hence the amount of eccentric throw of the pulley.

4. A shaking frame as in claim 1 wherein the longitudinal position of the pulley with respect to the third shaft is fixed and the traveler is moved with respect to both the third shaft and the pulley to vary the amount of eccentric throw of the pulley.

5. A shaking frame as in claim 1 including a thrust race bearing upon the end of the traveler and means to move the thrust race and hence to move the traveler with respect to the third shaft.

6. A shaking frame as in claim 1 wherein the outer surface of the traveler is cylindrical about the axis of rotation of the fourth shaft and a second key and keyway means is provided to prevent rotation of the pulley with respect to the fourth shaft while allowing longitudinal movement therealong.

7. A shaking frame as in claim 1 wherein the acute angle is in the range of two degrees to ten degrees.

8. A shaking frame as in claim 1 further including a motor to rotate the first the motor being mounted on the fixed frame.

9. An oscillating frame as in comprising a first fixed frame and a second frame supported for oscillation with respect to the first frame a first shaft including a first drive wheel on the first frame, a third shaft and associated variable eccentric drive on the second frame and drive means to drive the eccentric drive on the second frame and drive means to drive the eccentric drive from the first drive wheel wherein the variable eccentric drive pulley comprises the third shaft having a third longitudinal axis of rotation, a traveler on the third shaft adapted to move longitudinally along the length of the third shaft, first key and keyway means to prevent rotation of the traveler with respect to the third shaft, the outer surface of the traveler being of constant cross-section throughout its length and comprising a fourth shaft whose axis of rotation is inclined at an acute angle to the third longitudinal axis of rotation, and a pulley on the traveler adapted to move along the length of the traveler to rotate therewith, the pulley having its plane of rotation perpendicular to the third longitudinal axis of rotation and wherein the longitudinal position of the pulley with respect to the third shaft is fixed and the traveler is moved with respect to both the third shaft and the pulley to vary the amount of eccentric throw of the pulley.

* * * * *